May 25, 1937.    H. ROSENBERG    2,081,307
DAMPER BEARING UNIT
Filed Dec. 7, 1935    2 Sheets-Sheet 1
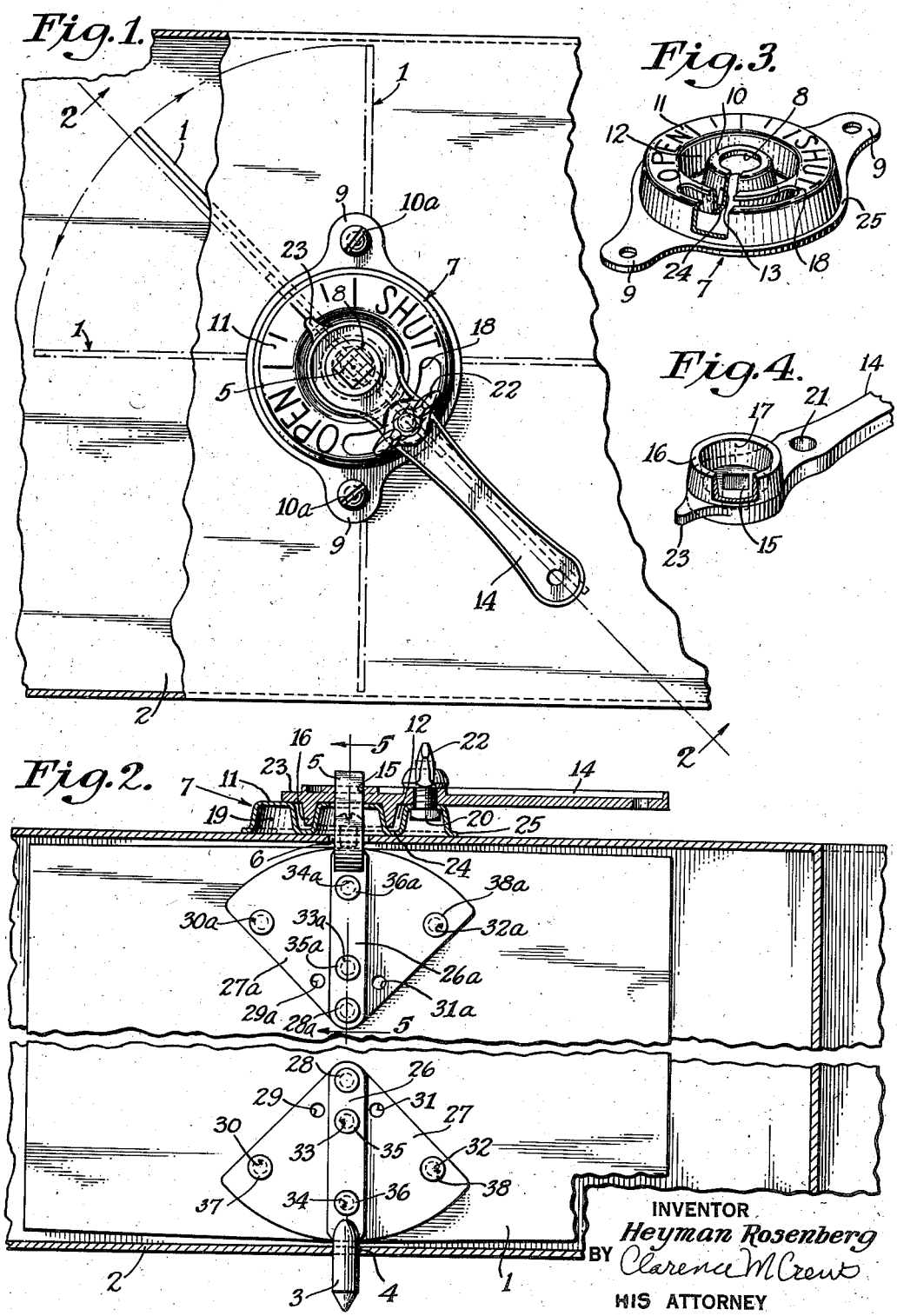
INVENTOR
Heyman Rosenberg
BY Clarence M Crew
HIS ATTORNEY May 25, 1937.　　　H. ROSENBERG　　　2,081,307
DAMPER BEARING UNIT
Filed Dec. 7, 1935　　　2 Sheets-Sheet 2
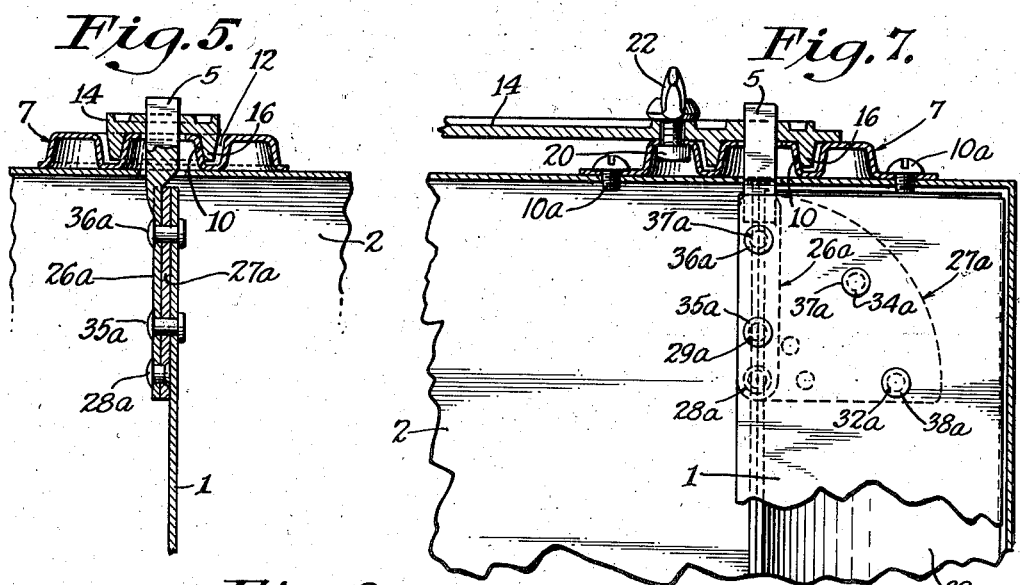
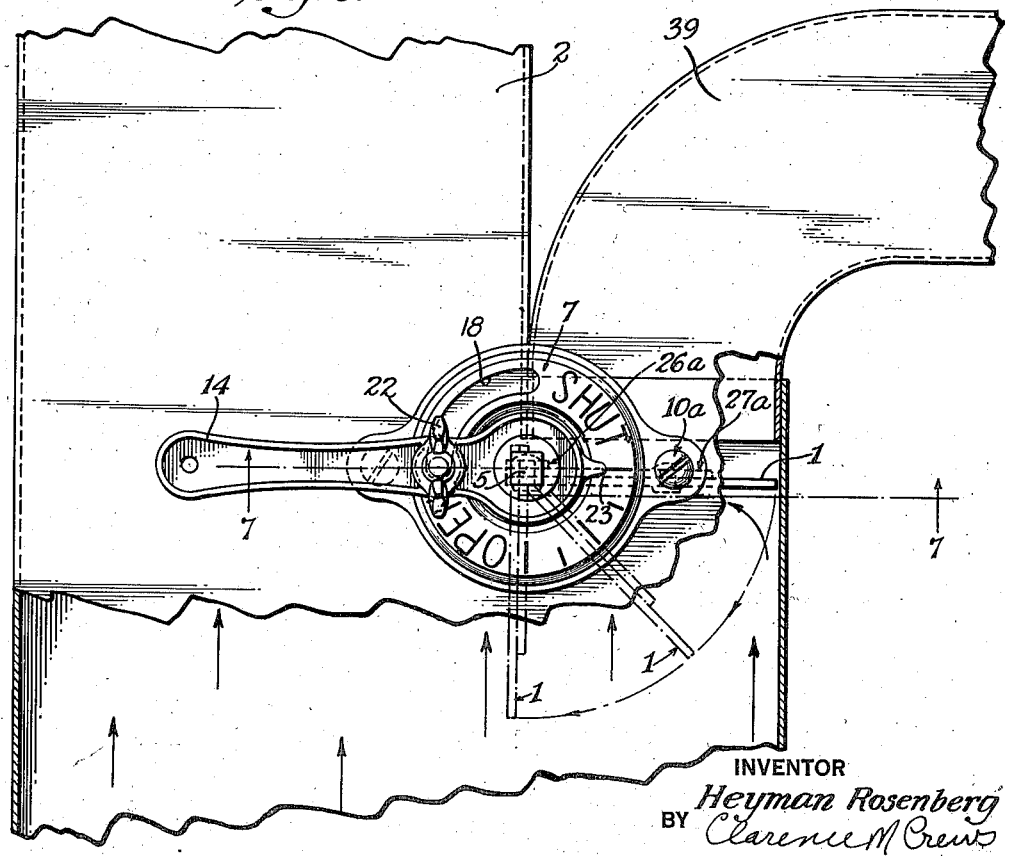
INVENTOR
Heyman Rosenberg
BY Clarence M Crews
HIS ATTORNEY Patented May 25, 1937

2,081,307

UNITED STATES PATENT OFFICE 2,081,307

DAMPER BEARING UNIT

Heyman Rosenberg, New York, N. Y.

Application December 7, 1935, Serial No. 53,305

4 Claims. (Cl. 126—292)

This invention relates to dampers for the control of air or other gaseous fluid, either hot or cold, in ducts, and more particularly to dampers of the dial type as disclosed in Letters Patent of the United States No. 1,324,620 granted to me on December 9, 1919. The present invention is in the nature of an improvement upon the invention disclosed in said patent.

In accordance with the disclosure of the patent referred to, provision is made of a damper blade having a non-circular stem attached to it and protruding through a side of the duct in which the damper is mounted. The non-circular stem extends through circular openings in the duct wall and in a dial attached to the outer face of the duct wall and carries upon its outer end a handle whereby the damper can be turned. Provision is made of means for securing the handle in different adjusted positions as desired. Since the square stem cannot fit the round openings through which it passes, leakage of air occurs past the stem in the patented structure. The non-circular stem, moreover, has some freedom of play in the round openings, so that binding frequently occurs when re-adjustment of the damper setting is undertaken.

In the patented structure, moreover, the stem and a bearing aligned with the stem and located at the opposite side of the duct, are secured to the damper solely along the pivotal axis of the damper. The construction, therefore, is not particularly rugged.

It is an object of the present invention to overcome disadvantages and drawbacks of this prior construction.

To this end it is a feature of the present invention that the dial plate is formed with a central, frusto-conical boss surrounded by an annular channel, and that the handle is provided on its lower face with an annular flange having an inner frusto-conical surface adapted to seat against and have sealing engagement with the frusto-conical surface of the central boss of the dial plate. The cooperating conical surfaces thus provided serve both to seal the structure against leakage of air past the damper stem, and also to provide cooperating bearing surfaces for supporting the handle. The bearing surfaces are of relatively large diameter and are of substantial longitudinal extent so that the handle and the damper are held steady and liability of binding is obviated.

In accordance with a further feature of the invention provision is made of bearing plates through which the damper bearing and damper stem are connected to the damper blade, both along the damper axis, and at points substantially removed from the damper axis, the bearing plates thus serving to reinforce the damper blade and to apply the stress to the damper blade over a wider area and through points of connection substantially removed from the pivot.

In accordance with still another feature of the invention the bearing plates are so constructed and assembled with the bearings as to admit of securement to the damper blade at either end of the blade or at any desired point between the ends of the blade.

In accordance with the last mentioned feature each bearing plate is desirably made substantially in the form of a sector, and openings are provided along different radii of the sector, as along the radii parallel to the edges of the sector and along a radius bisecting the angle formed by the edges of the sector. The bearing or stem proper comprises a plate finger pivotally connected to the bearing plate adjacent the vertex thereof and provided with openings at the same distances from the point of pivotal connection at which the openings in the bearing plate are formed. When it is desired to cause the axis of the damper to extend adjacent the left hand edge of the damper the bearing or stem finger openings are registered with the openings in the bearing plate adjacent the left hand edge of the latter, and rivets or other suitable fasteners are inserted through the thus aligned openings to provide plural points of connection of the finger and the plate to the damper along the axial line. Others of the openings in the bearing plate are then used for receiving rivets or other suitable fasteners to secure the bearing plate at additional points to the damper blade. When it is desired to cause the axis of the damper blade to extend adjacent the right hand edge of the blade, the finger openings are aligned with the openings adjacent the right hand edge of the bearing plate and the parts are secured together in the manner already indicated. When the axis of the damper is to extend through an intermediate portion of the damper, as through the middle of the damper, the intermediate openings of the bearing plate are registered with the finger openings and the parts are again connected in the manner already indicated.

Other objects and advantages will hereinafter appear.

In the drawings forming part of this specification

Fig. 1 is a fragmentary plan view showing a portion of a duct with a damper embodying features of the invention applied thereto;

Fig. 2 is a fragmentary view in sectional elevation taken upon the line 2—2 of Fig. 1, looking in the direction of the arrows;

Fig. 3 is a perspective view of the damper dial partly broken away;

Fig. 4 is a fragmentary, inverted perspective view, partly broken away, of the damper handle;

Fig. 5 is a fragmentary view in sectional elevation, taken upon the line 5—5 of Fig. 2, looking in the direction of the arrows;

Fig. 6 is a fragmentary plan view showing main and branch conduits with the damper mounted to have its axis extend adjacent its left hand edge, and Fig. 7 is a fragmentary view in sectional elevation, the section being taken along the line 7—7 of Fig. 6 looking in the direction of the arrows.

In Figs. 1 and 2 a damper 1 is shown mounted in a duct 2 so as to have its axis extend through the middle portion of the damper. The damper has attached to it a cylindrical bearing 3 which snugly fits a circular opening 4 formed in a wall of the duct 2. The damper also has secured to it a square stem 5 which extends through a circular opening 6 in the opposite side of the duct and which is disposed in axial alignment with the bearing 3.

A dial plate 7 is secured upon the outer side of the duct, the dial plate being provided with a central opening 8 in alignment with the openings 4 and 6. The dial plate 7 is provided with ears 9 for attachment to the duct, and attachment may be effected by the insertion of hardened "sheet metal" screws 10a through the ears 9 and the duct wall. The dial as viewed from above comprises a central boss 10 and an outer circular boss 11 with an intervening annular channel 12 between them. The lateral wall 13 of the central circular boss is desirably frusto-conical in form and provides a conical sealing and bearing surface for cooperation with a damper handle 14. The damper handle 14 is provided with a square opening 15 which snugly fits the square damper stem 5.

The handle 14 is provided at its lower side around the opening 15 with an annular flange 16. The inner wall 17 of the flange 16 is frusto-conical in form, being shaped to bear against the conical surface 13 of the boss 10 and fit such surface snugly. The cooperation of the engaged walls of the flange 16 and the boss 10 serves both to seal the structure against the flowing of air past the stem 5 and also to provide a steady bearing support for the handle 14 so that there is no tendency whatever for the handle to bind when the damper is being adjusted. These advantages constitute important features of the present invention.

The outer circular boss 11 of the dial plate has an arcuate slot 18 provided through a portion of the top thereof, the slot opening into an annular channel 19 formed at the lower side of the dial plate. A square headed bolt 20 is disposed with its head lying in and filling the width of the channel 19 and with its shank extending upward through the slot 18 and through an opening 21 in the handle 14. A wing nut 22 is threaded upon the upper end of the bolt 20 and may be turned either to clamp the handle 14 in an adjusted position or to unclamp the handle so as to permit adjustment thereof. Rotation of the bolt is prevented by engagement of the sides of its head with the walls of the channel 19. The handle is provided with a pointer 23 which cooperates with scale or graduation marks formed on a portion of the upper face of the boss 11. The upper face of the boss 11 may also be provided with the legends "Open" and "Shut" to guide the attendant in setting the damper.

The base 24 of the channel 12 is disposed in the plane of the rim 25 of the dial plate or, in other words, in a position to be pressed firmly against the outer face of the duct 2 when the dial plate is secured in place. The central space within the circular boss 10 is thus sealed against escape of air between the dial plate and the outer face of the duct. The bearing plate is desirably a sheet metal stamping.

As seen in Figs. 1 and 2 the axis of the damper extends across the middle of the damper blade and across the middle of the duct. The bearing 3 includes a damper attaching finger plate 26 to which a bearing plate 27 is pivotally connected by means of a rivet 28. The bearing plate, which is desirably in the form of a sector, is thus attached to the finger 26 prior to assembly with the damper blade. The workman installing the structure has an option of assembling the bearing and bearing plate with the damper in any one of several ways depending upon the desired location of the damper axis relative to the damper blade.

The assembly as shown in Figs. 1 and 2 would be employed when the axis of the damper is to extend across the middle of the damper blade. The bearing plate is provided with openings 29 and 30 disposed along a radius substantially parallel to the left hand edge of the plate, with openings 31 and 32 disposed along a radius substantially parallel to the right hand edge of the bearing plate, and with openings 33 and 34 disposed along a radius which substantially bisects the angle formed by the edges of the bearing plate. The openings 29, 31 and 33 are equidistant from the axis of the rivet 28, and the openings 30, 32 and 34 are equidistant from the axis of the rivet 28. The finger 26 is provided with an opening which may be registered with any one of the openings 29, 31 and 33 by rotating the finger upon the axis of the rivet 28 relative to the bearing plate. The finger 26 is also provided with an opening which may be registered with any one of the openings 30, 32 and 34 in the same manner. In an installation like that of Figs. 1 and 2 the openings of the finger 26 are registered with the openings 33 and 34 of the bearing plate and rivets 35 and 36 are applied through said openings and through the damper blade to secure the finger, the bearing plate, and the damper blade to one another in fixed relation along the damper axis. Additional rivets 37 and 38 are then applied through the openings 30 and 32, respectively, to fix the bearing plate to the damper at points remote from the damper axis. A punch may be employed for perforating the damper blade to receive the rivets after the workman has determined the proper locations for the rivet holes.

The stem 5, which constitutes the other bearing member of the damper, is similarly provided with a finger plate 26a and an associated bearing plate 27a which are in all respects duplicates of the finger plate 26 and the bearing plate 27 already described. These parts will not, therefore, be described in detail but the same reference numerals have been applied in each instance with the subscript "a" added.

In Figs. 6 and 7 disclosure is made of an installation requiring that the axis of the damper blade extend adjacent the left hand edge thereof. The duct 2 is shown as communicating with a branch duct 39 and the damper is mounted to control the branch duct. The construction and mounting of the damper is in all respects the same as that of Figs. 1 and 2 except that the fingers 26 and 26a are disposed along the left hand edge of the damper blade 1 and in a different angular relation to the bearing plate 27a. In this instance the openings of the finger 26a are registered with the openings 29a and 37a of the bearing plate 27a, and the rivets 35a and 36a are secured through the aligned openings and through openings punched in the damper blade. Rivets 37a and 38a are passed through the openings 34a and 32a respectively for attaching the bearing plate to the damper blade at points remote from the damper axis.

It will be apparent that where an installation requires that the axis of the damper extend adjacent the right hand edge of the damper blade the openings of the fingers 26 and 26a will be registered with the openings 31 and 32 and 31a and 32a, respectively.

Features relating to the dial plate and handle disclosed but not claimed herein form the subject matter of a divisional application, Serial No. 82,043 filed May 27, 1936, for Damper control dial.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. In a damper structure, the combination, with a damper blade, of a bearing unit therefor comprising a bearing member and a sector-like bearing plate pivotally secured thereto, said bearing member having a plurality of openings at different distances from the pivot, and said bearing plate having a plurality of radially disposed sets of openings adapted to be selectively registered with the openings of the bearing member by rotation about the pivot, fasteners passed through the openings of the bearing member, the registered members of the bearing plate and the damper blade for securing the parts together at a plurality of points along the damper axis, and additional fasteners passed through other openings of the bearing plate and through the damper blade for securing the bearing plate to the damper blade at points substantially removed from the axis.

2. In a damper structure, the combination, with a damper blade, of a bearing unit therefor, comprising a bearing member and a sector-like bearing plate pivotally secured thereto, said bearing member having a plurality of openings at different distances from the pivot, and said bearing plate having radially disposed sets of openings along radii substantially parallel to its edges and along an intermediate radius, the openings of each radially disposed set being at the same distances from the pivot as the openings formed in the bearing member so that they can be registered with the openings formed in the bearing member.

3. A bearing unit for application to a damper blade comprising a bearing member and a bearing plate pivotally secured thereto, said bearing plate having a series of sets of radially aligned openings, the openings of the several sets being all similarly spaced from the pivot, and the bearing member having a set of radially aligned openings so spaced from the pivot that the openings of the bearing member can be registered with the openings of any one of the sets of bearing plate openings.

4. In a damper structure, the combination with a damper blade, of a bearing unit adapted for connection to the blade in any one of several locations to locate the damper axis adjacent either edge of the damper blade or remote from both edges thereof, comprising a bearing member and a bearing plate pivotally secured together, said bearing member having a plurality of openings at different distances from the pivot, and said bearing plate having sets of openings disposed respectively adjacent its opposite edges and intermediate its edges, the openings of each set being related to the pivot in the same way that the openings of the bearing member are related to the pivot so that the openings of the bearing member can be selectively registered with the openings of any one of said sets of bearing plate openings.

HEYMAN ROSENBERG.